(12) United States Patent
Hirata et al.

(10) Patent No.: US 6,429,910 B1
(45) Date of Patent: Aug. 6, 2002

(54) LIQUID CRYSTAL DISPLAY DEVICE AND METHOD FOR REPAIRING BREAKAGE OF CIRCUIT LINES THEREOF

(75) Inventors: Tomoya Hirata; Tae Miyahara, both of Tokyo (JP)

(73) Assignee: NEC Corporation, Tokyo (JP)

( * ) Notice: Subject to any disclaimer, the term of this patent is extended or adjusted under 35 U.S.C. 154(b) by 71 days.

(21) Appl. No.: 09/666,819

(22) Filed: Sep. 21, 2000

(30) Foreign Application Priority Data

Sep. 28, 1999 (JP) .......................................... 11-275220

(51) Int. Cl.⁷ ............................................ G02F 1/1335
(52) U.S. Cl. ......................................... 349/54; 349/192
(58) Field of Search ............................... 349/40, 54, 55, 349/192

(56) References Cited

U.S. PATENT DOCUMENTS 5,608,558 A * 3/1997 Katsumi ..................... 349/192
6,072,550 A * 6/2000 Kim ........................... 349/192

FOREIGN PATENT DOCUMENTS

| JP | 5-5896 | 1/1993 |
| JP | 8-171081 | 7/1996 |
| JP | 9-146121 | 6/1997 |

* cited by examiner

*Primary Examiner*—James Dudek
(74) *Attorney, Agent, or Firm*—Hutchins, Wheeler & Dittmar

(57) ABSTRACT

In order to use an auxiliary wiring 4 formed on one of opposing substrates as a bypass line of one of circuit lines arranged in matrix on the same substrate, which has a broken portion, cross points (A and B) of the auxiliary wiring 4 and the broken circuit line are electrically connected by removing an insulating film between the auxiliary wiring and the circuit line by irradiating these cross points with a laser beam. An electrostatic protective element 10 is provided in each of cross points of the auxiliary wiring and the circuit lines and the auxiliary wiring is connected to a common terminal 13 connected to an opposing electrode formed on the other opposing substrate such that the potential of the auxiliary wiring can be removed.

11 Claims, 7 Drawing Sheets

LIQUID CRYSTAL DISPLAY DEVICE AND METHOD FOR REPAIRING BREAKAGE OF CIRCUIT LINES THEREOF

BACKGROUND OF THE INVENTION

1. Field of the Invention

The present invention relates to a liquid crystal display device and a method for repairing a breakage of circuit lines thereof and, particularly, a method for repairing a breakage of at least one of circuit lines formed on a thin film transistor (TFT) substrate of an active matrix type liquid crystal display panel.

2. Description of the Prior Art

Japanese Patent Application laid-open No. H5-5896 discloses an example of a conventional circuit line breakage repairing method for repairing a broken circuit line formed on a TFT substrate. The repairing method disclosed therein will be described with reference to FIGS. 1 and 2 in which FIG. 1 is a plan view of a pixel portion constituting an active matrix type liquid crystal display and FIG. 2 shows a broken portion 14 of a circuit line shown in FIG. 1 in an enlarged scale for explaining the repairing method therefor.

Figure 1:
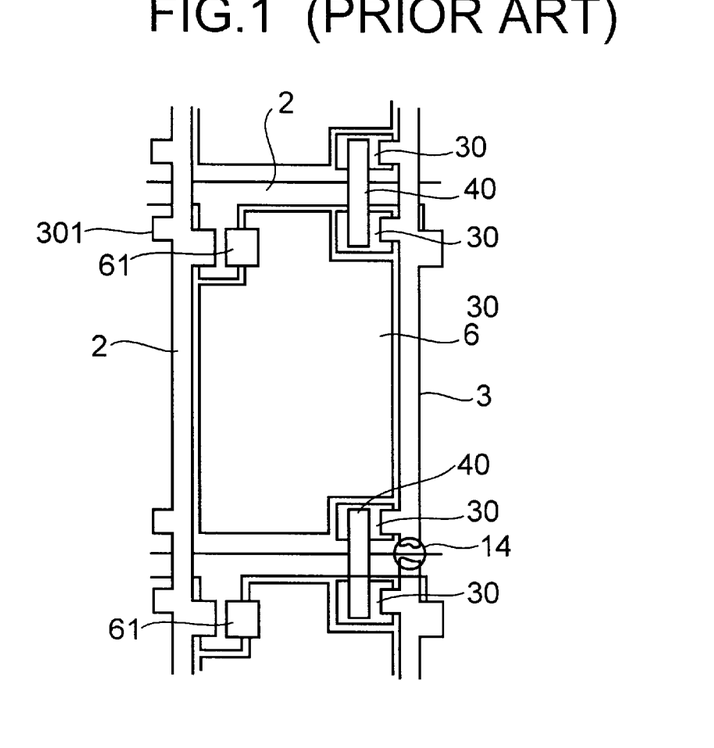
FIG. 1 is a plan view of a pixel of the first example of a conventional liquid crystal display panel.

In FIG. 1, each signal line 3 as the circuit line, which strides over a plurality of scan lines 2, has a pair of wider portions 301 on both sides of each scan line 2 and end portions of the wider portions 301 are overlapped on one end portions of first electrically conductive members 30 through insulating films, respectively. The other end portions of the first electrically conductive members 30 are overlapped on opposite end portions of a second electrically conductive member 40, which strides across the scan line 2, through insulating films, respectively.

Figure 2:
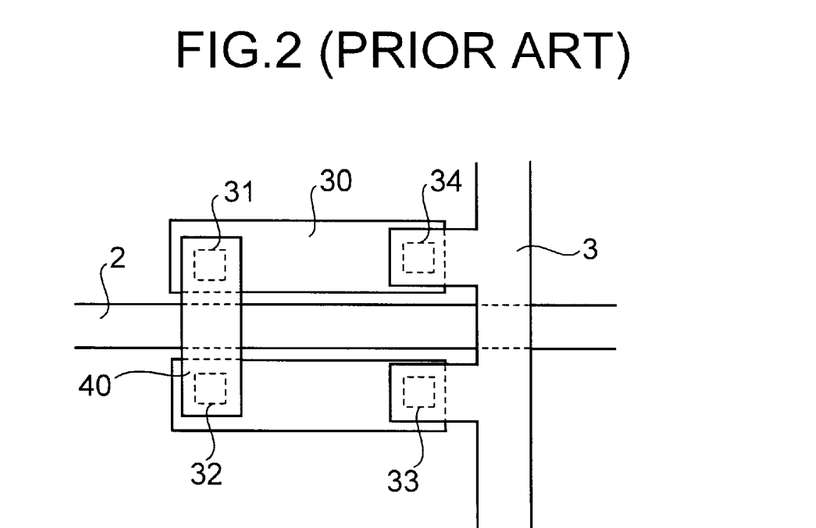
FIG. 2 shows, in an enlarged scale, a broken portion 7 of a wiring shown in FIG. 1.

In a case where the signal line 3 is broken at a portion indicated by 14, the overlapping portions (31 and 32 in FIG. 2) of the first electrically conductive member 30 and the second electrically conductive member 40 and the overlapping portions (33 and 34 in FIG. 2) of the signal line 3 and the first electrically conductive member 30 are irradiated with laser light to melt the insulating films between them to thereby electrically connect the electrically conductive members to thereby form a bypass line for the broken portion 14 of the signal line 3, as shown in FIG. 2.

However, since the signal line 3 has to have the wider portions 301, there are a problem of reduction of aperture ratio of a pixel and a problem of impossibility of repair of a breakage of the circuit line when the latter is a scan line since a correction pattern such as mentioned above is not provided in the scan line.

A method for solving such problems disclosed in Japanese Patent Application Laid-open No. H9-146121 will be described with reference to FIG. 3, which is a plan view of a liquid crystal display disclosed therein.

Figure 3:
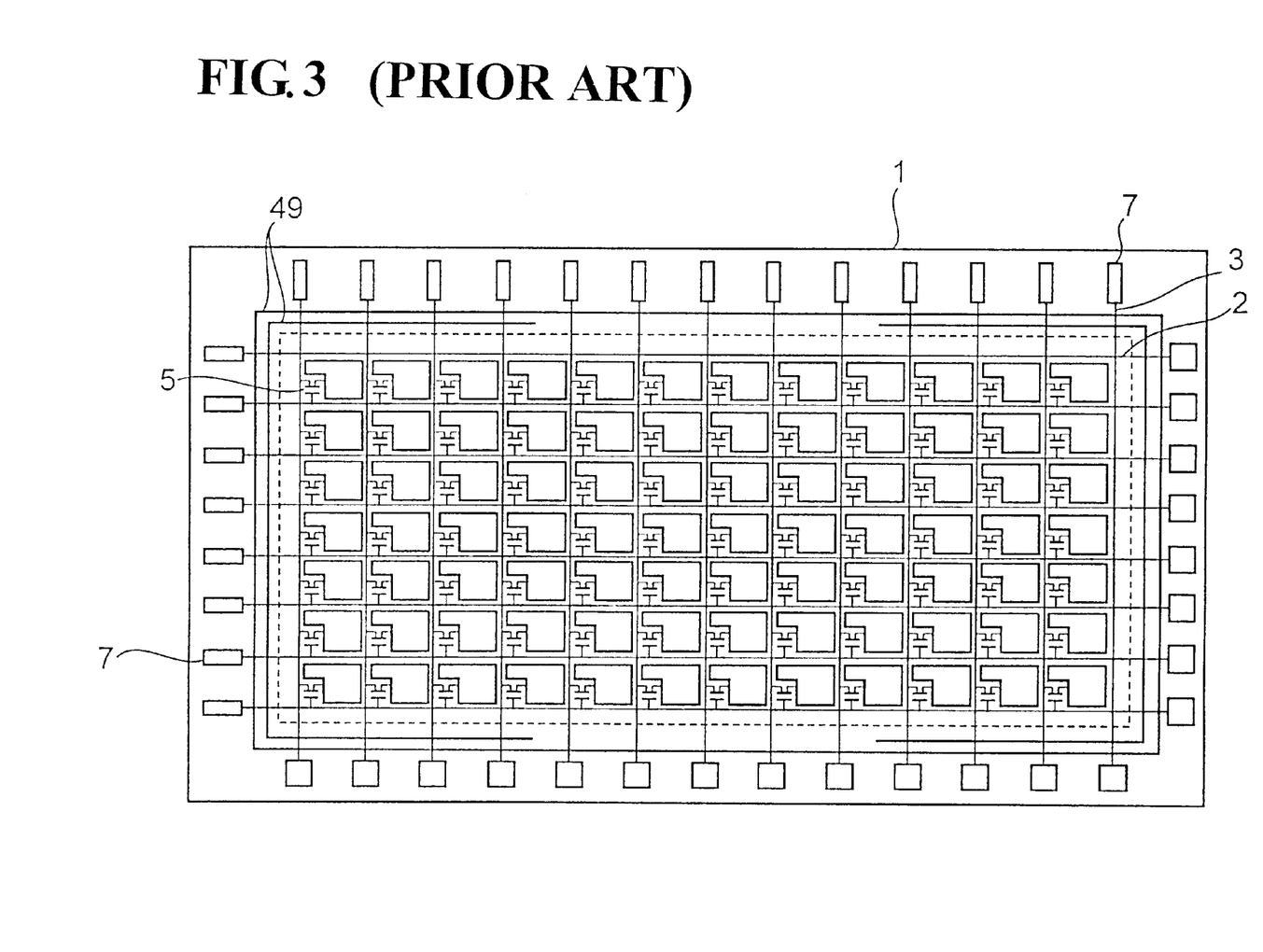
FIG. 3 shows a construction of the second example of the conventional liquid crystal display device.

In FIG. 3, the liquid crystal display panel is constructed with a transparent substrate 1 of an insulating material, a plurality of scan lines 2, which are arranged horizontally in parallel to each other with a constant gap formed on the transparent insulating substrate 1, a plurality of signal lines 3, which are arranged vertically in parallel to each other with a constant gap, formed on the transparent substrate 1, an insulating film electrically separating the scan lines 2 from the signal lines 3, a thin film transistor (TFT) 5 provided in each of cross portions of the scan lines 2 and the signal lines 3, a plurality of terminal 7 connected to one end portions of the scan lines 2 and the signal lines 3 and a plurality of auxiliary wiring 49 provided to surround a peripheral portion of a display region in which the thin film transistors 5 are arranged.

When a breakage occurs in one of the scan lines or the signal lines, the broken line is connected to the auxiliary wiring by irradiating the cross portion between the broken line and the auxiliary wiring 49. That is the auxiliary wiring is used as a bypass line for a broken portion of the scan or signal line.

In this technique, however, the auxiliary wiring is in a floating state electrically. Therefore, there is a problem that, in a case where electric charge is accumulated on the auxiliary wiring, electrostatic breakdown tends to occur since the electric charge can not be dispersed. Furthermore, there is another problem that, since a plurality of auxiliary wiring are provided, a space between an outer periphery of the display portion and an outer periphery of a substrate opposing to the transparent substrate, that is, a frame size, is increased.

Japanese Patent Application Laid-open No. H8-171081 discloses, as means for preventing electrostatic breakdown of the liquid crystal display panel, a construction in which a buffer portion is provided in an auxiliary wiring.

In the construction disclosed in Japanese Patent Application Laid-open No. H8-171081, however, since the auxiliary wiring extend on not only a TFT substrate but also a drive circuit substrate connected externally of the liquid crystal panel, a repair of a broken line has to be performed after a step (module step) for connecting the drive circuit substrate to the TFT substrate. Since it is practical that the breakdown of line tends to occur in a step (panel step) for forming the TFT substrate, it is preferable that the repair is performed prior to the module step, if possible.

Further, in the construction disclosed in Japanese Patent Application Laid-open No. H8-171081, there is a problem that the electrostatic breakdown occurs in assembling a polarizer plate in the panel step since the auxiliary wiring is in an electrically floating state during the panel step.

SUMMARY OF THE INVENTION

An object of the present invention is to provide a liquid crystal display device equipped with an inexpensive construction for repairing breakdown of circuit lines thereof and a method for repairing a breakdown of circuit lines of the liquid crystal display device.

Another object of the present invention is to provide a construction of a liquid crystal display device in which, when a circuit line breakdown occurs in a scan line or a signal line thereof, the broken portion of the circuit line can be easily and reliably repaired and a method for repairing the liquid crystal display device.

In order to achieve the above objects, according to the first aspect of the present invention, a liquid crystal display device in which an auxiliary wiring and one of circuit lines, which has a broken portion, are short-circuited at cross points thereof by irradiating the cross points by laser light such that the auxiliary wiring is used as a bypass circuit, is featured by that an electrostatic protective element is provided in each cross portion of the auxiliary wiring and the circuit lines and the auxiliary wiring is selectively separated from a common terminal to which a potential is applied from a signal processing substrate of the liquid crystal display device.

According to the second aspect of the present invention, a wiring breakage repairing method for repairing a broken circuit line in a liquid crystal display device including an auxiliary wiring, which crosses opposite end portions of scan lines and signal lines and is applied with a constant potential, and electrostatic protective elements each provided in each cross portion, is featured by comprising the steps of irradiating a cross portion of the auxiliary wiring and a scan line or a signal line, which has a broken portion, with laser light, cutting away a connecting pattern between a common terminal and the auxiliary wiring or separating a signal processing substrate for applying a potential to the auxiliary wiring from the auxiliary wiring and using the auxiliary wiring as a bypass line for the broken line.

In a liquid crystal display device constructed such that cross points between an auxiliary wiring and one of circuit lines, which has a broken portion, are short-circuited to use the auxiliary wiring as a bypass line for the broken portion, the present invention is featured by that an electrostatic protective element is provided in each of the cross points between the auxiliary wiring and the circuit lines and the auxiliary wiring can be switched off from a state in which the auxiliary wiring is fixed to a certain constant potential applied from a drive circuit substrate to an opposing substrate through a common terminal (COM terminal).

Particularly, the liquid crystal display device is featured by that it includes a thin film transistor substrate of the active matrix type, that the circuit lines constitute the signal lines and the scan lines, which are orthogonal to and electrically separated from the signal lines by an insulating film, are connected to the respective thin film transistors, that a first region portion of the auxiliary wiring, which is in parallel to the signal lines, are formed in a plane coplanar with a plane in which the signal lines are formed, that a second region portion of the auxiliary wiring, which is in parallel to the scan lines, are formed on in a plane coplanar with a plane in which the scan lines are formed and that the first region portion and the second region portion of the auxiliary wiring are electrically connected each other through through-holes formed in the insulating film.

Furthermore, the liquid crystal display device is featured by that the liquid crystal display device includes a drive circuit substrate electrically connected to a thin film transistor substrate, that the auxiliary wiring formed on the thin film transistor substrate is electrically connected to the COM terminal provided on the drive circuit substrate and that supply cut-off means such as a zero ohm resister is detachably provided on the drive circuit substrate.

Alternatively, the liquid crystal display device is featured by that it includes a drive circuit substrate electrically connected to the thin film transistor substrate, that a plurality of supply terminals provided on the drive circuit substrate and kept at a common potential and terminals of the auxiliary wiring provided on the thin film transistor substrate are electrically connected each other and that a cut pattern having a narrowed portion is provided between the auxiliary wiring terminals and the auxiliary wiring.

Moreover, according to the present invention, a broken line repair method for repairing a defective circuit line having a broken portion by electrically connecting an auxiliary wiring to a circuit line, which has a breakage, of a liquid crystal display device by irradiating cross points of the auxiliary wiring and the defective circuit line to remove the insulating film therebetween to thereby use the auxiliary wiring as a bypass line for the broken portion of the defective circuit line is featured by comprising the steps of electrically connecting the auxiliary wiring to the defective circuit line while the auxiliary wiring is fixed to a constant potential applied to an opposing substrate through the terminals (COM terminals) to which a certain constant potential is applied from the drive circuit substrate and, then, of cutting off the application of the constant potential to the auxiliary wiring.

The electrically connecting step is performed in a state where the electrostatic protective elements are provided in the cross points between the auxiliary wiring and the circuit wiring.

Furthermore, the cutting step is performed by removing the short-circuit member such as chip type zero ohm resistor provided on the signal processing substrate.

Alternatively, the cutting step is performed by cutting the narrowed portion of the cut pattern provided between the common potential supply terminals, that is, the COM terminals, and the auxiliary wiring.

BRIEF DESCRIPTION OF THE DRAWINGS

This above mentioned and other objects, features and advantages of the present invention will become more apparent by reference to the following detailed description of the invention taken in conjunction with the accompanying drawings, in which.

DETAILED DESCRIPTION OF THE PREFERRED EMBODIMENTS

The present invention will be described in detail with reference to the drawings, which show embodiments of the present invention.

Figure 4:
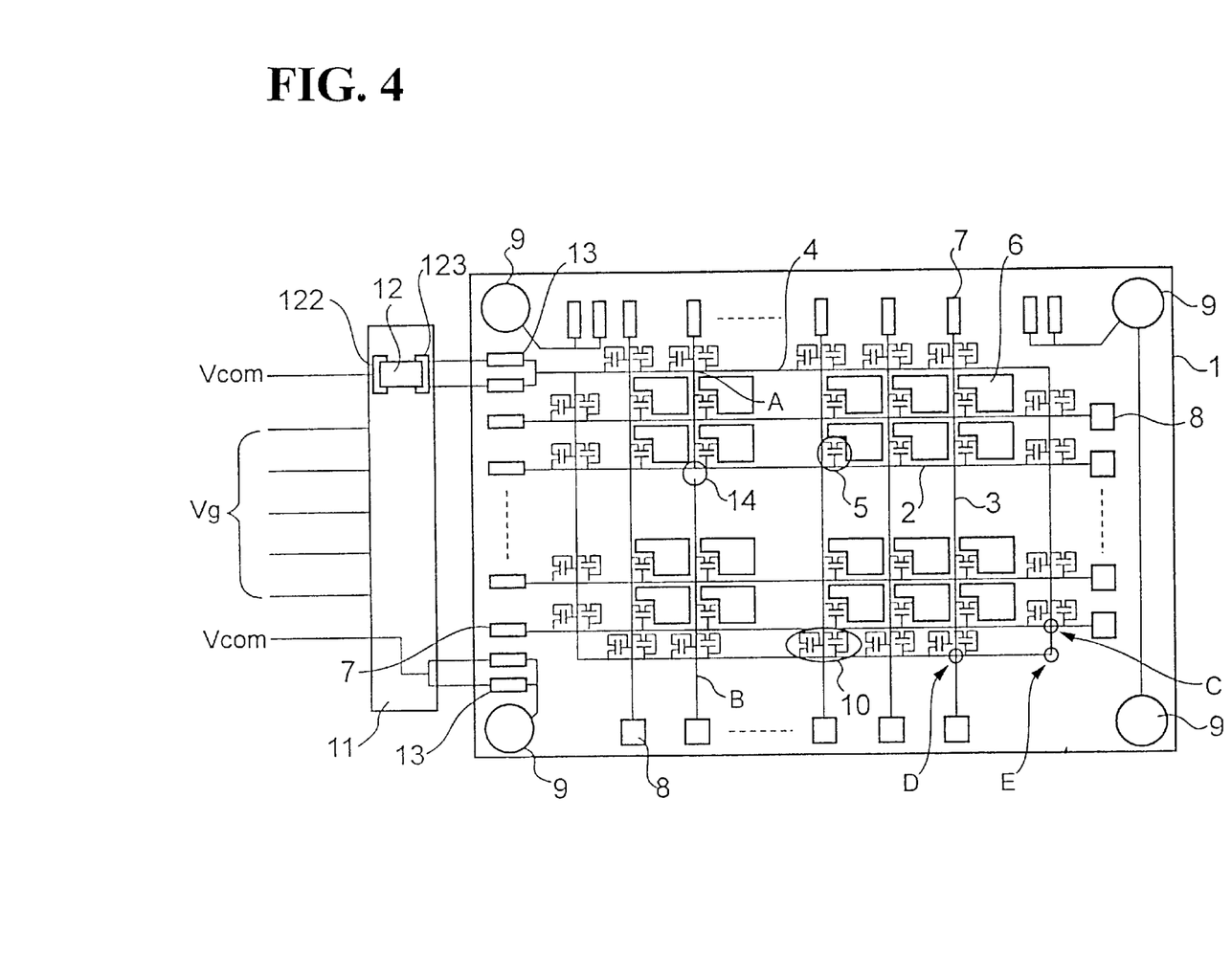
FIG. 4 shows a construction of a liquid crystal display device according to a first embodiment of the present invention.

As shown in FIG. 4, a liquid crystal display device to which the present invention is applied comprises a liquid crystal display panel constructed a transparent substrates 1 of an insulating material, an opposing transparent substrate (not shown) of an insulating material and liquid crystal defined between the transparent substrates 1 and the opposing substrate. A plurality of scan lines 2 and a plurality of signal lines 3 are provided in a matrix on the transparent substrates 1. One ends of the scan lines 2 and the signal lines 3 are connected to circuit terminals 7, respectively, and the other ends of the scan lines and the signal lines are connected to measuring pads 8, respectively. In each cross point of the scan lines 2 and the signal lines 3, a thin film transistor (TFT) 5 having a gate electrode, a drain electrode and a source electrode and a pixel electrode 6 to which a data signal is supplied from the source electrode of the TFT 5 are provided. The transparent substrate 1 will be referred to as a TFT substrate, hereinafter.

An auxiliary wiring; 4 is formed such that it surrounds a display area including a plurality of TFTs 5 and the corresponding number of the pixel electrodes 6, which are arranged in a matrix. The auxiliary wiring 4 crosses the scan lines 2 and the signal lines 3 through an insulating film 23 and is connected to common terminals 13 feeding an opposing electrode provided on the opposing substrate. That is, the auxiliary wiring 4 is connected to a power source for supplying a potential supplied from a signal processing substrate 11 to the opposing electrode.

A transfer pad 9 is provided in each of four corners of the TFT substrate 1 and the transfer pads 9 are connected to a common electrode provided on the opposing substrate (not shown). In FIG. 4, a common potential Vcom is externally supplied to the common terminal 13 connected to the transfer pad 9 in the left side lower corner of the transparent insulating substrate 1. Although, in this example, the common potential is supplied to one of the transfer pads, which is located in the left side lower corner, it is, of course, possible to feed another transfer pad 9 located in another corner of the TFT substrate 1.

Figure 5:
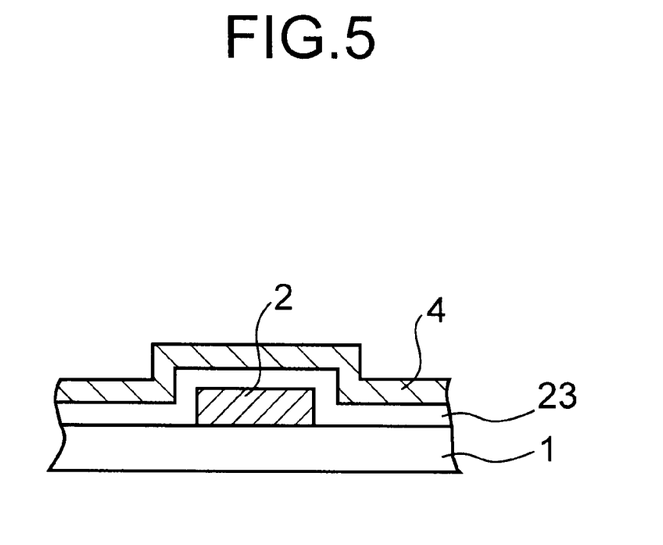
FIG. 5 is a cross section of a cross portion of an auxiliary wiring and a scan line, which is shown in FIG. 4.
Figure 6:
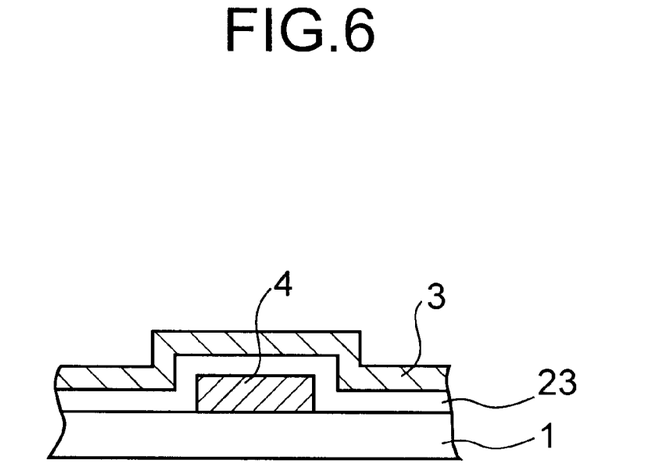
FIG. 6 is a cross section of a cross portion of an auxiliary wiring and a signal line, which is shown in FIG. 4.

In a cross point C of the auxiliary wiring 4 and the scan line 2, the auxiliary wiring 4 is formed on the insulating film 23 such that it strides over the scan line 2 formed below the insulating film 23 as shown in FIG. 5. On the other hand, in a cross point D of the auxiliary wiring 4 and the signal line 3, the signal line 3 is formed on the insulating film 23 such that the signal line 3 strides over the auxiliary wiring 4 formed below the insulating film 23 as shown in FIG. 6.

Figure 8:
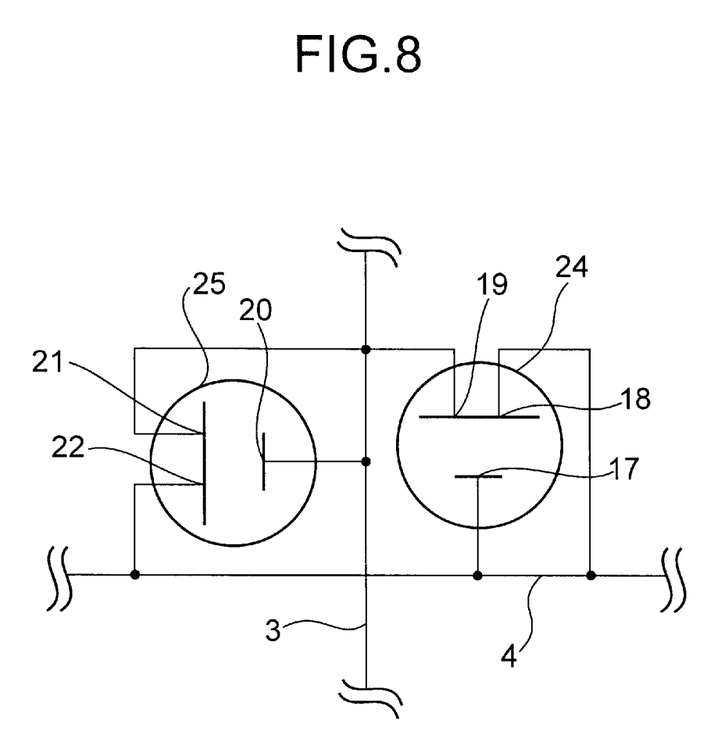
FIG. 8 is an equivalent circuit of an electrostatic protective element shown in FIG. 4.

An electrostatic protective element 10 is provided in each cross portion. An equivalent circuit of the electrostatic protective element 10 is shown in FIG. 8. As shown in FIG. 8, the electrostatic protective element 10 is composed of a pair of high resistance transistors 24 and 25. The transistor 24 has a gate electrode 17 and a drain electrode 18, both of which are connected to the auxiliary wiring 4, and a source electrode 19 thereof is connected to the signal line 3. A gate electrode 20 and a drain electrode 21 of the transistor 25 are connected to the signal line 3 and a source electrode 22 thereof is connected to the auxiliary wiring 4.

As shown in FIG. 4, a zero ohm resistor 12 is provided on the signal processing substrate 11 for supplying potential to the common terminal 13, which is provided in a left side upper corner of the TFT substrate 1 and connected to the auxiliary wiring 4, and is connected in series to the common terminals 13. In FIG. 4, the zero ohm resistor 12 is provided between a pad 122 connected to the external common voltage source Vcom and a pad 123 connected to the common terminals 13 on the TFT substrate 1 to short-circuit between the pads 122 and 123, that is, electrically connect the pad 122 to the pad 123.

The zero ohm resistor 12 is a chip resistor, which is of an electrically conductive material having a very small or zero resistance and is used as a substitution of a jumper line used to short-circuit a circuit including the jumper line. Such chip resistor is advantageous in view of reduction of manufacturing cost compared with the jumper line, since an automatic part mounting apparatus can be applied thereto.

In FIG. 4, the electrical connection between the signal processing substrate 11 and the circuit terminals 7 of the TFT substrate 1 is not shown. However, it should be noted that the drive circuit of the liquid crystal display device is formed as TCP (Tape Carrier Package) on which chips such as drive LSIs, etc., driven by external drive power source Vg are mounted. Similarly, a drive circuit substrate provided on an upper side of the TFT substrate 1 and connected to the terminals of the signal lines 3 is also not shown in FIG. 4. Furthermore, although the common terminal 13 is shown as a terminal pair in order to make the connection thereof to the auxiliary wiring reliable, the common terminal 13 can be provided by only one terminal.

Figure 7:
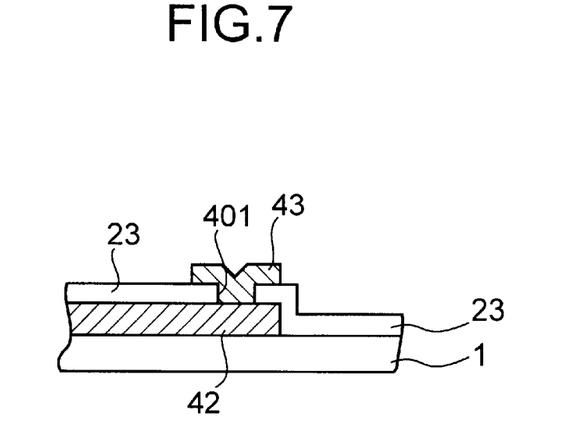
FIG. 7 is a cross section of a cross portion of a corner portion of an auxiliary wiring and a signal line, which is shown in FIG. 4.

The auxiliary wiring 4 crossing the scan lines 2 is formed in a plane coplanar with a plane in which the signal lines 3 is formed, as shown in FIG. 5, and the auxiliary wiring 4 crossing the signal lines 3 is formed in a plane coplanar with a plane in which the scan line 2 is formed, as shown in FIG. 6. In other words, two line portions of the auxiliary wiring 4, which are in parallel to the scan lines 2, are formed of the same material as that of the scan lines 2 in the same plane as that of the scan lines 2 simultaneously with the formation of the scan lines 2. On the other hand, two line portions of the auxiliary wiring 4, which are in parallel to the signal lines 3, are formed of the same material as that of the signal lines 3 in the same plane as that of the signal line 3 simultaneously with the formation of the signal lines 3 on the insulating film 23 such as a gate insulating film, etc. Therefore, the four sides of the auxiliary wiring 4 are spatially separated from each other by the common insulating film 23 since the signal lines 3 and the scan lines 2 are separated from each other by the insulating film 23. However, in order to electrically connect the four sides of the auxiliary wiring 4 together, a through-hole is formed in the insulating film 4 in each of corner regions E of the auxiliary wiring 4, as shown in FIG. 4. That is, as shown in FIG. 7, a through-hole 401 for electrically connecting a layer 42 for the auxiliary wiring 4, which is formed in forming the scan lines 2, to a layer 43 for the auxiliary wiring 4, which is formed in forming the signal lines 3, is formed in the insulating film 23 in each corner region E, so that the auxiliary wiring 4 is formed as a closed circuit.

An operation of the electrostatic protective element 10 when a high voltage is applied to the auxiliary wiring 4 will be described with reference to FIG. 8.

When a high voltage is applied to the auxiliary wiring 4, a high voltage is applied to the gate electrode 17 and the drain electrode 18 of the transistor 24. Therefore, the transistor 24 is turned on and a current flows through the source electrode 19 thereof. Consequently, the voltage is applied to the signal lines 3. Since the voltage applied to the auxiliary wiring 4 is applied to the signal lines 3 through the transistors 24, electrostatic breakdown of the pixels is prevented.

In a case where a high voltage is applied to the scan line 2 and the signal line 3, the transistor 25 operates similarly to the operation of the transistor 24 in the case where the high voltage is applied to the auxiliary wiring 4 and performs the protective function against electrostatic breakdown. The electrostatic protective element provided in the cross portion of the scan line 2 and the auxiliary wiring 4 operates similarly.

Now, a method for repairing a broken point of a signal line or a scan line of a liquid crystal display device, according to the present invention, will be described. The present repairing method comprises the step of irradiating the cross points (points A and B in FIG. 4) of the auxiliary wiring 4 and the signal line 3, which is electrically and spatially separated from the auxiliary wiring 4 by the insulating film 23 and is broken at a location 14, with laser beam to remove the insulating film 23 therebetween to thereby electrically connect the signal line 3 to the auxiliary wiring 4. After this electrical connection processing is completed, the zero ohm resistor 12 mounted on the signal processing substrate 11 or a periphery thereof is removed to electrically separate the auxiliary wiring 4 from the common terminal.

Thus, it is possible to electrically connect one portion of the signal line 3 to the other portion thereof, which is separated from the one portion by the breakage of the signal line 3 at the location 14, through the auxiliary wiring 4, by the first repairing work, that is, the electrical connection processing. Furthermore, since it is possible to cut the potential supply to the auxiliary wiring by a second repairing work, that is, the removal processing of the zero ohm resistor, data potential can be supplied to the whole signal line having a broken portion, through the auxiliary wiring 4 as a bypass line therefor.

In a case where the scan line is broken, the same work as that mentioned for the case where the signal line is broken is performed similarly. That is, the first repairing work is performed for cross points of the broken scan line and the auxiliary wiring 4 with using laser beam and then the second repairing work is performed.

Since the zero ohm resistor 12 is provided in the circuit on the signal processing substrate 11 connected to the common terminal 13 on the TFT substrate 1 and the potential supply to the auxiliary wiring can be cut by removing the zero ohm resistor 12, the repairing work can be done easily and reliably.

Furthermore, since the electrostatic protective element 10, which functions to cause current to flow to the scan line or the signal line when a high voltage is applied to the auxiliary wiring, is provided in each of the cross portions between the auxiliary wiring and the signal lines and between the auxiliary wiring and the scan lines, the electrostatic breakdown caused by the auxiliary wiring can be avoided.

Figure 9:
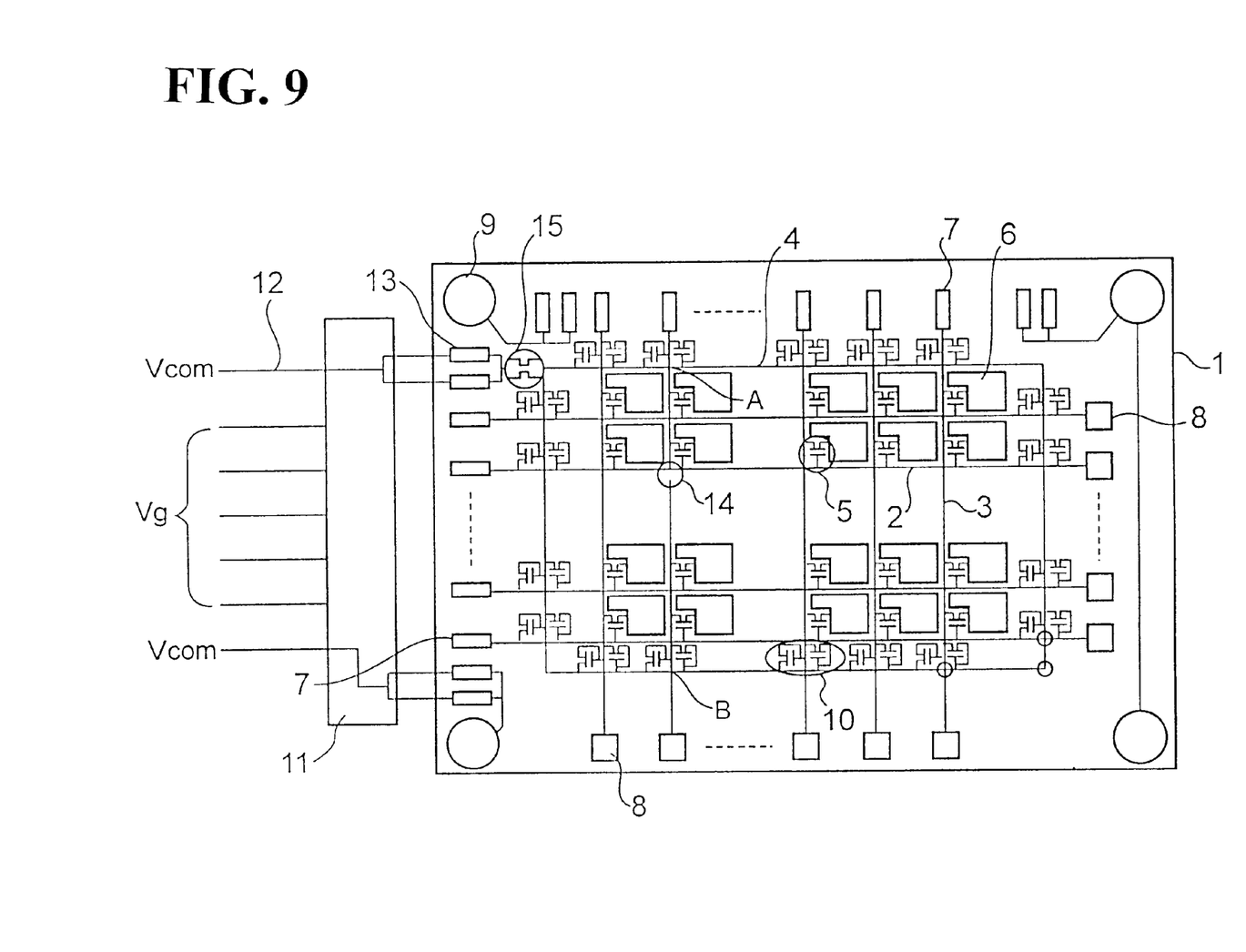
FIG. 9 shows a construction of a liquid crystal display device according to the second embodiment of the present invention.

A liquid crystal display device according to the second embodiment of the present invention will be described with reference to FIG. 9.

An auxiliary wiring 4 is formed such that it surrounds a display area including a plurality of TFTs 5 and the corresponding number of the pixel electrodes 6, which are arranged in a matrix. The auxiliary wiring 4 crosses the scan lines 2 and the signal lines 3 and connected to a common terminal 13. An electrostatic protective element 10 is provided in each cross portion. The above mentioned construction is the same as that of the liquid crystal display device according to the first embodiment shown in FIG. 4.

Figure 10:
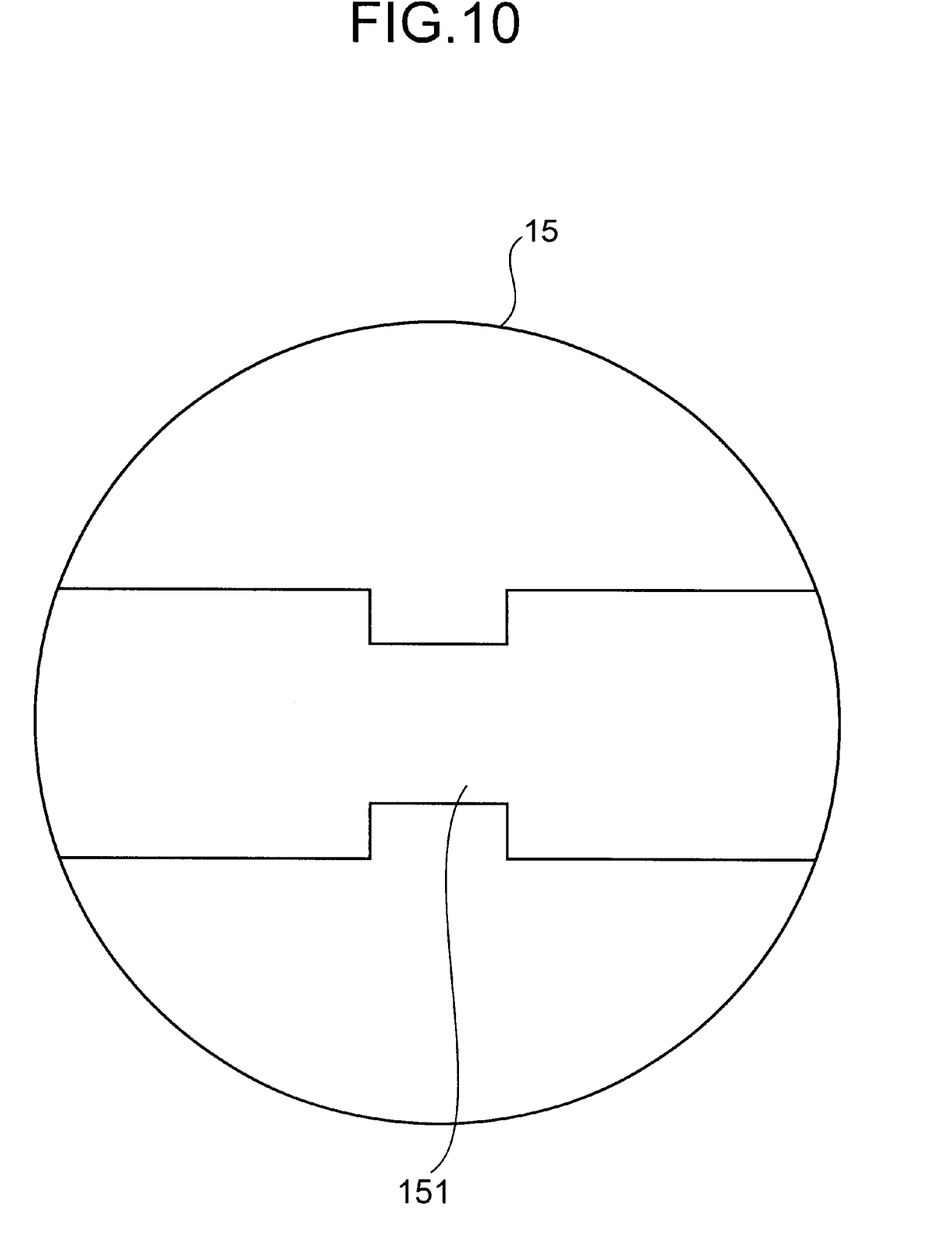
FIG. 10 is an enlarged view of a cut pattern shown in FIG. 9.

The second embodiment is featured in that a connecting line between the common terminal 13 and the auxiliary wiring 4 takes in the form of a cut pattern 15. In FIG. 10, which shows the cut pattern 15 in enlarged scale, the connecting wiring includes a cut portion 151 having narrowed width in order to facilitate the cutting by laser beam.

A method for repairing a broken point of a signal line or a scan line of a liquid crystal display device according to the second embodiment of the present invention comprises the first repairing step of irradiating the cross points (points A and B in FIG. 9) of the auxiliary wiring 4 and the signal line 3, which is broken at a location 14, with laser beam to electrically connect the signal line 3 to the auxiliary wiring 4 and the second repairing step of cutting the narrowed portion 151 of the cut pattern 15 with laser irradiation.

Since it is possible to electrically connect one portion of the signal line 3 to the other portion thereof, which is separated from the one portion by the breakage of the signal line 3 at the location 14, through the auxiliary wiring 4, by the first repairing work and it is possible to cut the potential supply to the auxiliary wiring by the second repairing work, data potential can be supplied to the whole signal line having a broken portion, through the auxiliary wiring 4 as a bypass line.

In a case where the scan line is broken, the same works as those mentioned for the case where the signal line is broken are performed similarly. That is, the first repairing work is performed for cross points of the broken scan line and the auxiliary wiring 4 with using laser beam and then the second repairing work is performed.

Since, in this embodiment, there is the cut pattern 15 is provided in the circuit on the transparent insulating substrate 1 for connecting the auxiliary wiring 4 to the common terminal 13 and the potential supply to the auxiliary wiring can be cut by cutting the cut pattern, the repair of the broken line can be easily and reliably performed.

Although, in the described embodiments, laser irradiation means is used as means for electrically connecting the auxiliary wiring to the signal line or scan line at the crossing point thereof by melting the insulating layer therebetween, other means such as electron beam irradiation can be used in lieu of the laser means. However, the laser irradiation may be most effective practically at present.

As described hereinbefore, the liquid crystal display device and the repair method according to the present invention can make an easy and reliable repair of a broken line possible. Furthermore, since the auxiliary wiring is connected to all of the scan lines and all of the signal lines through the electrostatic protective elements, respectively, current flows to the scan lines and the signal lines when a high voltage is applied to the auxiliary wiring. Therefore, the possibility of electrostatic breakdown caused by the auxiliary wiring can be reduced.

Moreover, according to the present invention, since the auxiliary wiring is fixed to a common potential applied through the common terminal provided on the TFT substrate, there is no need of providing other wiring for the same purpose.

As mentioned previously, according to the technique disclosed in Japanese Patent Application Laid-open No. H8-171081, the broken line can be repaired only after the connecting step (module step) of connecting the drive circuit and/or the common substrate to the TFT substrate. According to the present invention, however, the repair of broken line can be performed immediately after the preparation of the TFT substrate (panel step) since there is the auxiliary wiring provided on the TFT substrate. It is practical that the breakdown of line tends to occur in the panel step. Therefore, according to the present invention, it is possible to increase the repairing speed and to reduce the manufacturing time of the liquid crystal display device.

Furthermore, according to the technique disclosed in Japanese Patent Application Laid-open No. H8-171081, the spare wiring is not connected to the drive circuit and is in a floating state during the panel step. Therefore, the electrostatic breakdown tends to occur. According to the present invention, however, the auxiliary wiring is not in a floating state during the panel step since the electrostatic protective transistors are connected to the auxiliary wiring. Moreover, the auxiliary wiring is not in a floating state even immediately after the supply of the common potential thereto is cut off. Therefore, there is no electric charge accumulated on the auxiliary wiring, causing the possibility of electrostatic breakdown to be reduced more reliably.

When a liquid crystal display device produced according to the present invention does not require any repair of broken line, the auxiliary wiring may not be used while being kept at the common potential.

Although the present invention has been described with reference to specific embodiments, this description is not meant to be construed in a limiting sense. Various modifications of the disclosed embodiments will become apparent to persons skilled in the art upon reference to the description of the invention. It is, therefore, contemplated that the appended claims will cover any modifications or embodiments as fall within the true scope of the present invention.

What is claimed is:

1. A liquid crystal display device comprising: an auxiliary wiring formed on one of opposing substrates; a plurality of matrix arranged circuit lines formed on said one substrate, one of said circuit lines including a broken portion, said auxiliary wiring and said one circuit line being electrically connected to each other at a cross point thereof such that said auxiliary wiring can be used as a bypass line for said one circuit line; and an electrostatic protective element provided in each of said cross points of said auxiliary wiring and said circuit lines; said auxiliary wire being arranged so as to be separated from a state of fixed potential, which is applied to an opposing electrode formed on the other of said opposing substrates through said one substrate.

2. A liquid crystal display device as claimed in claim 1, wherein said one substrate is an active matrix type thin film transistor substrate, said circuit lines constitute signal lines and scan lines connected to respective thin film transistors formed on said active matrix type thin film transistor substrate, said signal lines are separated from said scan lines by an insulating film, a first region portion of said auxiliary wiring, which is in parallel to said signal lines are formed on a plane coplanar with a plane in which said signal lines are formed and a second region portion of said auxiliary wiring, which is in parallel to said scan lines, are formed in a plane coplanar with a plane in which said scan lines are formed, said first region portion and said second region portion being electrically connected each other through through-holes formed in said insulating film.

3. A liquid crystal display device as claimed in claim 2, further comprising a drive circuit substrate electrically connected to said thin film transistor substrate and short-circuit means for electrically connecting a supply terminal formed on said drive circuit substrate for supplying the potential to said opposing electrode to a terminal of said auxiliary wiring provided on said thin film transistor substrate, said short-circuit means being selectively removed from said drive circuit substrate.

4. A liquid crystal display device as claimed in claim 3, wherein said short-circuit means is a zero ohm resistor.

5. A liquid crystal display device as claimed in claim 2, further comprising a drive circuit substrate electrically connected to said thin film transistor substrate, a supply terminal formed on said drive circuit substrate for supplying the potential to said opposing electrode being electrically connected to a terminal of said auxiliary wiring provided on said thin film transistor substrate, and a cut pattern provided between said terminal of said auxiliary wiring and said auxiliary wiring, said cut pattern having narrowed portion.

6. A wiring breakage repairing method for repairing a broken wiring of a liquid crystal display device, by electrically connecting an auxiliary wiring formed on one of opposing substrates and one of a plurality of matrix arranged circuit lines formed on said one opposing substrate at a cross point thereof, said one circuit line having a broken portion, such that said auxiliary wiring is used as a bypass line for said broken circuit line, said wiring breakage repairing method comprising the steps of:

electrically connecting said auxiliary wiring to said one circuit line while a potential of said auxiliary wiring is fixed to a potential of an opposing electrode formed on the other opposing substrate; and removing the potential of said auxiliary wiring.

7. A wiring breakage repairing method as claimed in claim 6, wherein the electrically connecting step is performed by irradiating said cross portion of said auxiliary wiring and said one circuit line with a laser beam.

8. A wiring breakage repairing method as claimed in claim 6, wherein the electrically connecting step is performed under condition that an electrostatic protective element is provided in each of said cross portions of said auxiliary wiring and said circuit lines.

9. A wiring breakage repairing method as claimed in claim 6, wherein the removing step is performed by removing a chip type short-circuit member provided between said auxiliary wiring and a potential supply terminal of said auxiliary wiring for fixing the potential of said auxiliary wiring.

10. A wiring breakage repairing method as claimed in claim 9, wherein said chip type short-circuit member is a chip type zero ohm resistor.

11. A wiring breakage repairing method as claimed in claim 6, wherein the removing step is performed by cutting a narrowed portion of a cut-pattern provided between said auxiliary wiring and a potential supply terminal of said auxiliary wiring for fixing the potential of said auxiliary wiring.

* * * * *